(12) United States Patent
Wang et al.

(10) Patent No.: US 10,110,784 B2
(45) Date of Patent: Oct. 23, 2018

(54) IMAGE PROCESSING APPARATUS AND IMAGE PROCESSING METHOD

(71) Applicant: PANASONIC INTELLECTUAL PROPERTY MANAGEMENT CO., LTD., Osaka (JP)

(72) Inventors: Qinhe Wang, Kanagawa (JP); Akihiro Furuta, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 15/120,602

(22) PCT Filed: Feb. 25, 2015

(86) PCT No.: PCT/JP2015/000946
§ 371 (c)(1),
(2) Date: Aug. 22, 2016

(87) PCT Pub. No.: WO2015/129260
PCT Pub. Date: Sep. 3, 2015

(65) Prior Publication Data
US 2017/0013175 A1 Jan. 12, 2017

(30) Foreign Application Priority Data

Feb. 26, 2014 (JP) .................................. 2014-035953
Feb. 6, 2015 (JP) .................................. 2015-022716

(51) Int. Cl.
*H04N 5/217* (2011.01)
*H04N 5/21* (2006.01)
(Continued)

(52) U.S. Cl.
CPC ............. *H04N 5/217* (2013.01); *G06T 5/002* (2013.01); *G06T 5/008* (2013.01); *G06T 5/50* (2013.01);
(Continued)

(58) Field of Classification Search
None
See application file for complete search history.

(56) References Cited

U.S. PATENT DOCUMENTS

2006/0146377 A1* 7/2006 Marshall ............... G06T 3/4038
358/486
2007/0071343 A1* 3/2007 Zipnick .................... G06T 5/50
382/254
(Continued)

FOREIGN PATENT DOCUMENTS

JP 06-225178 8/1994
JP 2009-239425 10/2009
(Continued)

OTHER PUBLICATIONS

Search Report issued in International Patent Application No. PCT/JP2015/000946, dated May 12, 2015.

*Primary Examiner* — Thai Q Tran
*Assistant Examiner* — Christopher Braniff
(74) *Attorney, Agent, or Firm* — Greenblum & Bernstein, P.L.C.

(57) ABSTRACT

An image processing apparatus is provided which performs image processing of an input frame image. Contrast analyzer generates a histogram of the input frame image and calculates contrast based on the histogram. Motion-detecting threshold setter calculates a lower-limit threshold and an upper-limit threshold of a motion-detecting threshold by using an input-operated motion-detecting level and the calculated contrast. Motion detector determines that an observation pixel is moving considerably in a case where a finite (Continued)

difference value between frames is greater than the upper-limit threshold, and sets composite ratio K such that compositing of a preceding frame image is not performed. In a case where the finite difference value is smaller than the lower-limit threshold, the observation pixel is determined to be stationary, and composite ratio K is set such that compositing of the preceding frame image is performed at the maximum ratio.

7 Claims, 20 Drawing Sheets

(51) Int. Cl.
| | |
|---|---|
| *H04N 5/232* | (2006.01) |
| *H04N 7/18* | (2006.01) |
| *G06T 5/00* | (2006.01) |
| *G06T 5/50* | (2006.01) |
| *H04N 5/14* | (2006.01) |
| *H04N 5/77* | (2006.01) |

(52) U.S. Cl.
CPC ........... *H04N 5/21* (2013.01); *H04N 5/23293* (2013.01); *H04N 7/18* (2013.01); *G06T 2207/10016* (2013.01); *G06T 2207/20021* (2013.01); *G06T 2207/20092* (2013.01); *G06T 2207/20212* (2013.01); *H04N 5/144* (2013.01); *H04N 5/77* (2013.01)

(56) References Cited

U.S. PATENT DOCUMENTS

| | | |
|---|---|---|
| 2009/0244297 A1 | 10/2009 | Toba |
| 2010/0201828 A1 | 8/2010 | Mitsuya et al. |
| 2013/0314557 A1 | 11/2013 | Furukawa |

FOREIGN PATENT DOCUMENTS

| | | |
|---|---|---|
| JP | 2010-183386 | 8/2010 |
| JP | 2012-170006 | 9/2012 |

* cited by examiner

| MOTION-DETECTING LEVEL | REFERENCE VALUE OF LOWER-LIMIT MOTION-DETECTING THRESHOLD | REFERENCE VALUE OF UPPER-LIMIT MOTION-DETECTING THRESHOLD |
|---|---|---|
| 0 | 255 | 255 |
| 1 | 127 | 255 |
| ⋮ | ⋮ | ⋮ |
| 14 | 2 | 4 |
| 15 | 0 | 0 |

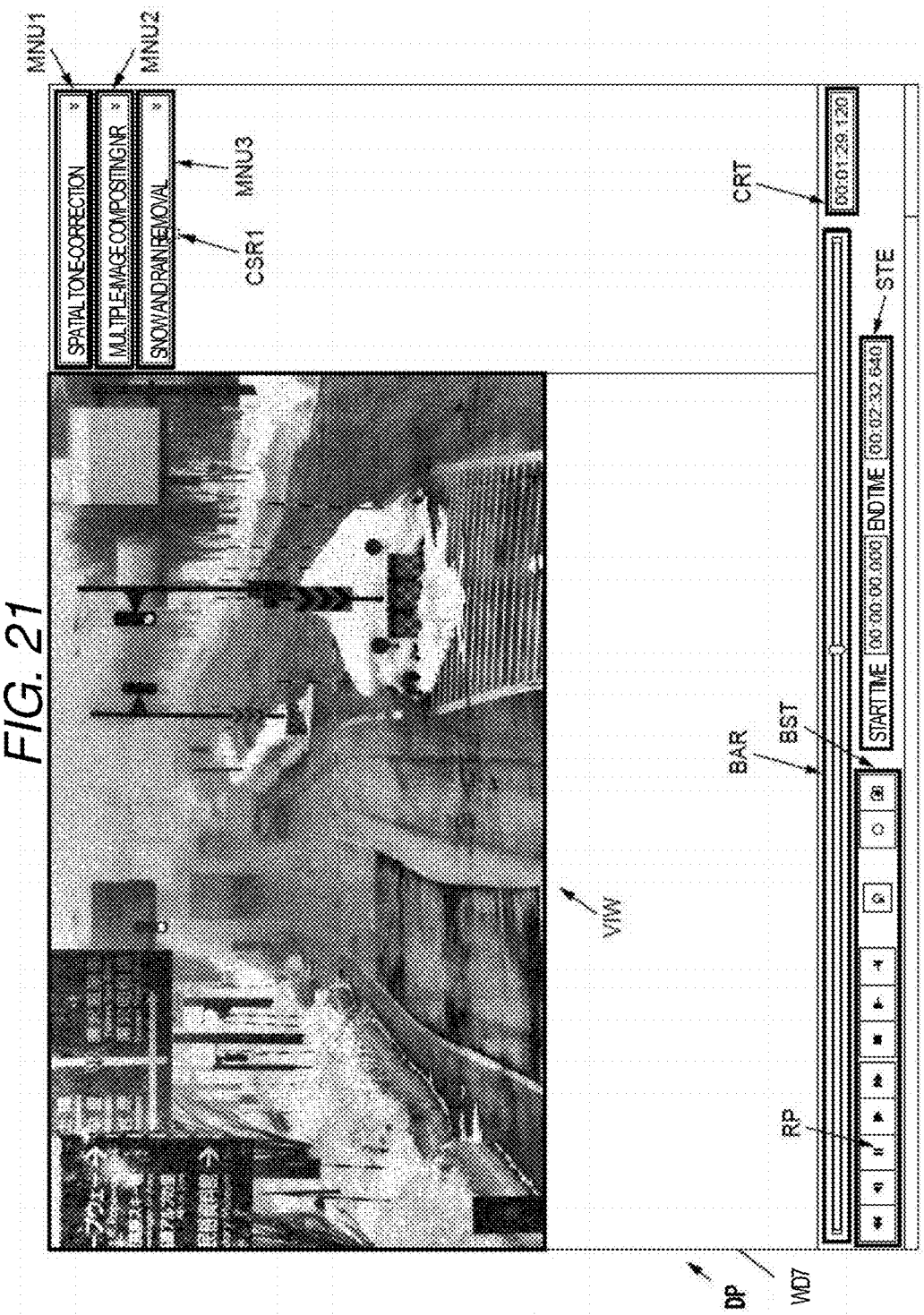

IMAGE PROCESSING APPARATUS AND IMAGE PROCESSING METHOD

TECHNICAL FIELD

The present invention relates to an image processing apparatus which performs image processing of an input frame image, and an image processing method.

BACKGROUND ART

In the related art, in order to improve S/N, there is a known image processing apparatus generating a composite image by performing compositing of an input frame image and a preceding frame image in which noise is reduced (for example, refer to PTL 1).

PTL 1 discloses an image processing apparatus that uses a finite difference value (specifically, a finite difference value of luminance) between the input frame image and the preceding frame image in which noise is reduced. The image processing apparatus is determined to be moving in a case where the finite difference value between the frame images is greater than a threshold and is determined to be stationary in a case where the finite difference value therebetween is smaller than the threshold. Moreover, the image processing apparatus reduces an after-image of a mobile object by adjusting the value of a composite ratio of the preceding frame image subjected to compositing with the input frame image to a smaller value with respect to an image area in which motion is present, based on a determination result.

CITATION LIST

Patent Literature

PTL 1: Japanese Patent Unexamined Publication No. 6-225178

SUMMARY OF THE INVENTION

However, in the configuration of PTL 1, depending on the contrast of an input frame image, there are cases where a finite difference value of luminance of a mobile object between frame images does not become uniformly constant. For example, in a frame image of low contrast, the finite difference value of luminance of the mobile object between frame images becomes lower than a threshold, and thus, it is difficult to detect the mobile object. Therefore, the mobile object is erroneously detected as a stationary object so that an after-image of the mobile object increases. Meanwhile, in a frame image of high contrast, the mobile object is easily detected, and thus, the after-image of the mobile object is reduced. In other words, in the configuration of PTL 1, there are cases where the after-image of the mobile object appears or disappears as contrast fluctuates.

In addition, when there is the presence of fluctuation of contrast within one frame image, it is difficult to detect the mobile object in an image area of low contrast as described above, and thus, a similar problem occurs. In this manner, when contrast fluctuates between the input frame image and a preceding frame image or in one input frame image, it is difficult to uniformly detect the mobile object. Thus, in the composite image in which S/N is improved in accordance with PTL 1, there is a problem in that the after-image of the mobile object appears.

In order to solve the above-described problems in the related art, the present invention aims to provide an image processing apparatus in which an after-image of a mobile object in a composite image is reduced even in a case where contrast fluctuates, and an image processing method.

According to the present invention, there is provided an image processing apparatus which performs image processing of an input frame image. The image processing apparatus includes a contrast calculator that calculates contrast of the input frame image; a first input-operation processor that receives an input of a motion-detecting level with respect to the input frame image; a threshold calculator that calculates a motion-detecting threshold corresponding to the motion-detecting level and the contrast; a memory that stores a preceding frame image after being subjected to the image processing; and a composite image generator that generates a composite image of the input frame image and the preceding frame image based on a comparison result of a finite difference value between the input frame image and the preceding frame image, and the motion-detecting threshold.

According to the present invention, there is provided an image processing method of an image processing apparatus which performs image processing of an input frame image. The image processing method includes a step of calculating contrast of the input frame image; a step of receiving an input of a motion-detecting level with respect to the input frame image; a step of calculating a motion-detecting threshold corresponding to the motion-detecting level and the contrast; and a step of generating a composite image of the input frame image and a preceding frame image after being subjected to the image processing based on a comparison result of a finite difference value between the input frame image and the preceding frame image, and the motion-detecting threshold.

According to the present invention, an after-image of a mobile object in a composite image can be reduced even in a case where contrast fluctuates.

BRIEF DESCRIPTION OF DRAWINGS

FIG. 21 is a view illustrating a display example in which the display area of the viewer of a video image and the display area of each image processing menu are displayed on the same screen showing a video image after being subjected to each type of the image processing such as spatial tone correction, multiple-image compositing NR, and snow and rain removal.

DESCRIPTION OF EMBODIMENTS

Exemplary embodiments of an image processing apparatus and an image processing method according to the present invention will be individually described with reference to the drawings. The image processing apparatus of each exemplary embodiment performs image processing of an input frame image output from an electronic device such as a camera and a recorder. In addition, without being limited to the image processing apparatus and the image processing method, the present invention may be expressed as a program for causing a computer to execute an operation regulated by the image processing method, or a computer readable recording medium.

First Exemplary Embodiment

Figure 1:
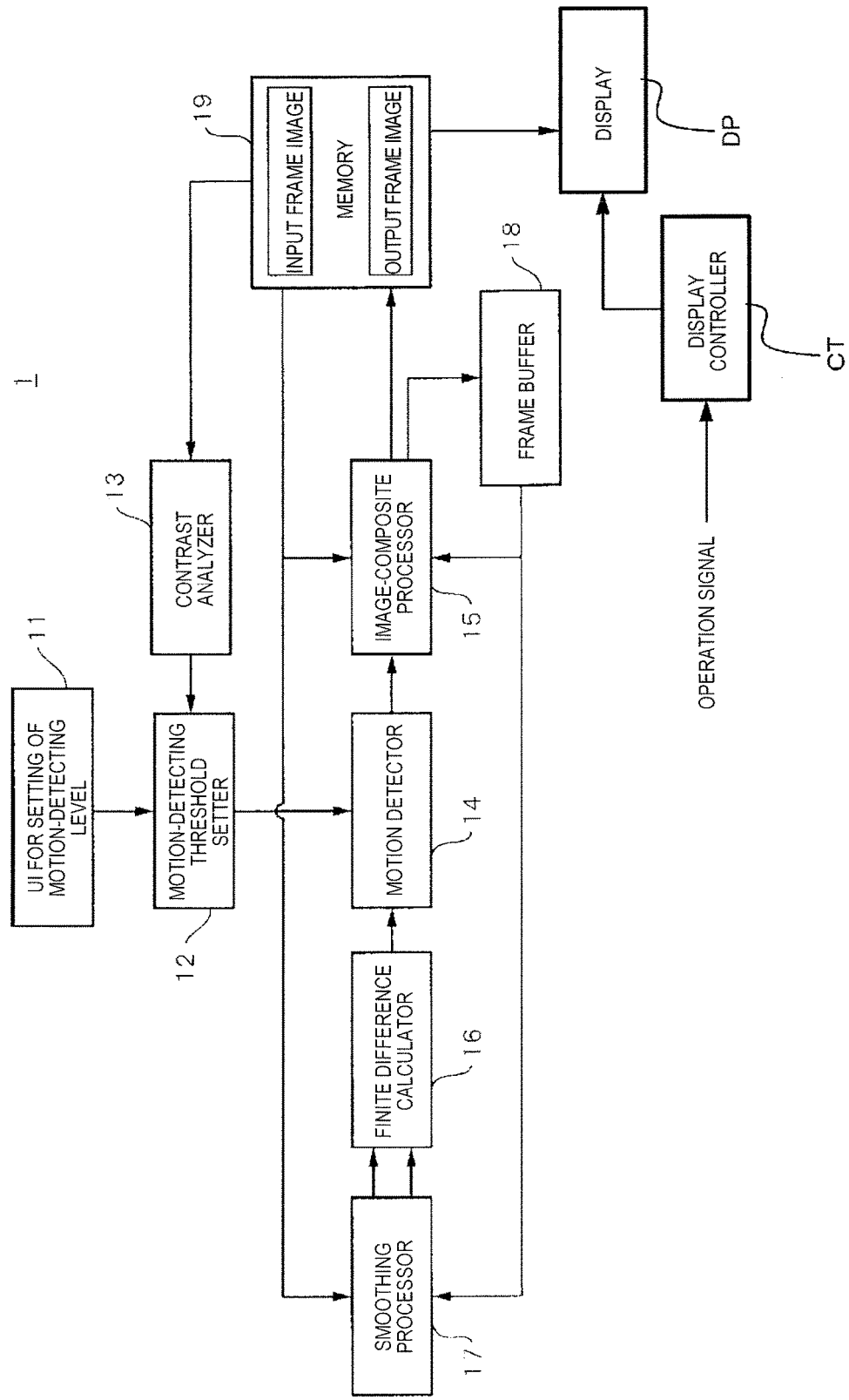
FIG. 1 is a block diagram illustrating a configuration of an image processing apparatus, according to a first exemplary embodiment.

FIG. 1 is a block diagram illustrating a configuration of image processing apparatus 1, according to a first exemplary embodiment. Image processing apparatus 1 has UI 11 for setting of motion-detecting level, motion-detecting threshold setter 12, contrast analyzer 13, motion detector 14, image-composite processor 15, finite difference calculator 16, smoothing processor 17, frame buffer 18, and memory 19.

Memory 19 stores the input frame image and an output frame image after being subjected to the image processing. Frame buffer 18 stores a frame image subjected to the preceding image processing (a preceding frame image).

The input frame image stored in memory 19 is input by contrast analyzer 13 which is an example of a contrast calculator, and contrast analyzer 13 calculates contrast of an image.

A motion-detecting level designated by a user is set through UI (user interface) 11 for the setting of motion-detecting level. The details of UI 11 for the setting of motion-detecting level will be described later.

Motion-detecting threshold setter 12 which is an example of a threshold calculator calculates a motion-detecting threshold based on contrast calculated by contrast analyzer 13, and a motion-detecting level set through UI 11 for the setting of motion-detecting level. Motion-detecting threshold setter 12 outputs the calculated result to motion detector 14. The details of the calculating of a motion-detecting threshold will be described later.

The input frame image is input from memory 19 by smoothing processor 17, and a preceding frame image is input from frame buffer 18. A result obtained by performing two-dimensional low-pass filter processing for spatial smoothing with respect to the images is output to finite difference calculator 16.

Finite difference calculator 16 calculates a finite difference value (here, luminance difference) of pixels or areas between an input frame image subjected to the two-dimensional low-pass filter processing and the preceding frame image. Finite difference calculator 16 outputs the result (the finite difference value between frames) to motion detector 14.

Motion detector 14 compares the finite difference value of pixels or areas between frames with the motion-detecting threshold. Motion detector 14 calculates composite ratio K of the input frame image and the preceding frame image based on the comparison result.

An input frame image stored in memory 19 and a preceding frame image stored in frame buffer 18 are input by image-composite processor 15 which is an example of a composite image generator. Image-composite processor 15 generates a composite image by performing compositing of the preceding frame image with respect to the input frame image in accordance with composite ratio K. The output frame image (composite image) is stored in memory 19, and frame buffer 18 stores the composite image as a preceding frame image for the next processing.

Figure 2:
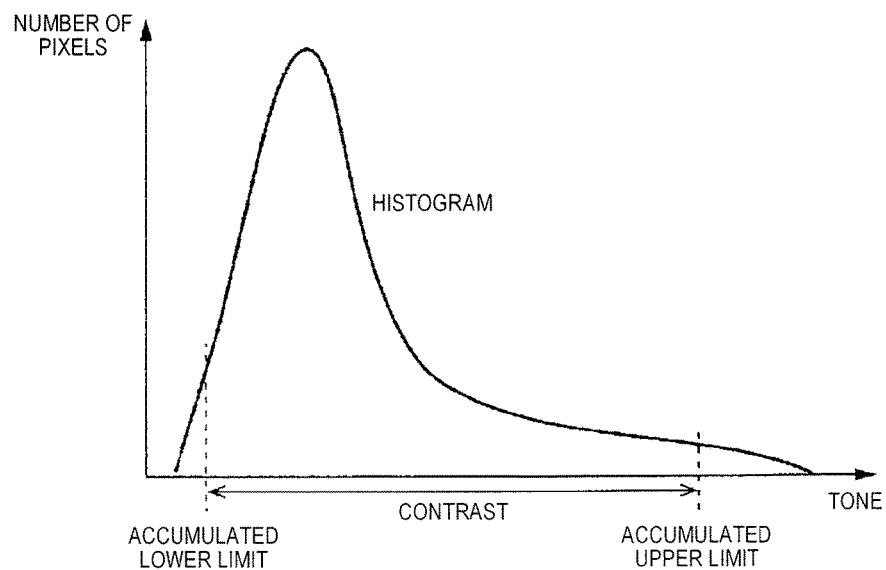
FIG. 2 is a graph illustrating a histogram used when contrast is calculated by a contrast analyzer.

FIG. 2 is a graph illustrating a histogram used when contrast is calculated by contrast analyzer 13. The horizontal axis indicates tone and the vertical axis indicates the number of pixels. The gross area in the histogram is the total number of pixels in an image. In the present exemplary embodiment, contrast is defined as a range of the accumulated upper limit and the accumulated lower limit of the histogram. The accumulated upper limit of the tone corresponds to 95% of the total number of pixels. The accumulated lower limit of the tone corresponds to 5% of the total number of pixels. The values of 95% of the accumulated upper limit and 5% of the accumulated lower limit are examples and may be respectively set to different values.

Figure 3:
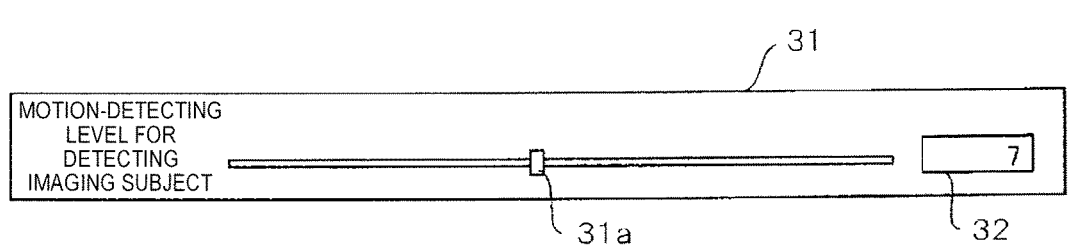
FIG. 3 is a view illustrating a UI for setting of a motion-detecting level.

FIG. 3 is a view illustrating UI 11 for the setting of motion-detecting level. UI 11 for the setting of motion-detecting level has a display and an input-operation processor. For example, UI 11 for the setting of motion-detecting level is configured to have input devices such as a touch panel or a display, and a mouse.

A screen of UI 11 for the setting of motion-detecting level displays slide-bar 31 which can be operated by a user setting the motion-detecting level, and value display 32. When a user operates slider 31a on slide-bar 31, the motion-detecting level changes.

Figures 4, 5:
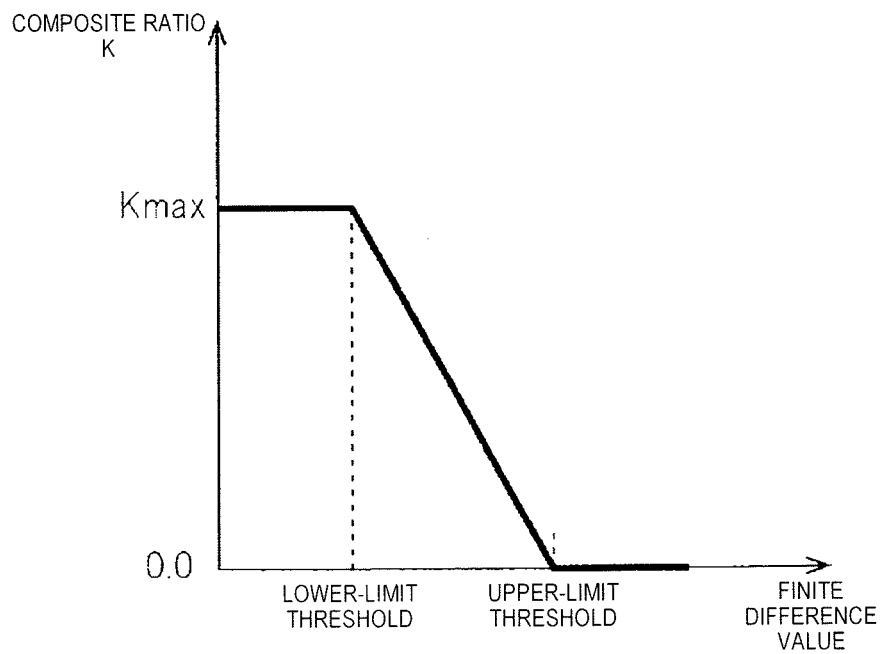
FIG. 4 is a view illustrating registration contents of a motion-detecting threshold table in which motion-detecting thresholds respectively corresponding to the motion-detecting levels are set.
FIG. 5 is a graph showing a composite ratio K.

FIG. 4 is a view illustrating registration contents of motion-detecting threshold table 41 in which the motion-detecting thresholds corresponding to the motion-detecting levels are set. Motion-detecting threshold table 41 is retained in motion-detecting threshold setter 12. Motion-detecting threshold setter 12 obtains a reference value of the motion-detecting threshold corresponding to the input motion-detecting level with reference to motion-detecting threshold table 41. As the reference values of the motion-detecting thresholds, the reference values of the lower-limit threshold and the upper-limit threshold (refer to FIG. 5) are obtained. For example, in a case where the motion-detecting level is the value 1, the reference values of the lower-limit threshold and the upper-limit threshold are respectively set to "127" and "255". The maximum value of the reference values is "255", and the minimum value thereof is "0".

Motion-detecting threshold setter 12 adjusts the motion-detecting threshold in accordance with Expression (1) by applying the contrast calculated by contrast analyzer 13 with respect to the reference values of the lower-limit threshold and the upper-limit threshold obtained as the reference values of the motion-detecting thresholds.

[Expression 1]

$$\text{Motion-detecting threshold} = \text{Reference value of motion-detecting threshold} \times \text{Contrast value} \quad (1)$$

Here, the contrast value is a value obtained by normalizing contrast of an image within a range of values from 0.0 to 1.0. The contrast value 0.0 indicates the minimum value of contrast, and the contrast value 1.0 indicates the maximum value of the contrast.

FIG. 5 is a graph showing composite ratio K. The horizontal axis indicates the finite difference value, and the vertical axis indicates composite ratio K. Here, composite ratio K indicates a composite ratio of a preceding frame image. Therefore, the composite ratio of an input frame image is expressed through "1.0-K".

When the finite difference value of pixels or areas between frames is smaller than the lower-limit threshold, image processing apparatus 1 is determined to be stationary, and composite ratio K is thereby set to value Kmax. Kmax is a value greater than 0.0 and smaller than 1.0. Meanwhile, when the finite difference value is greater than the upper-limit threshold, image processing apparatus 1 is determined to be moving considerably, and composite ratio K is thereby set to the value 0.0.

In a case where the finite difference value between frames is within a range of the lower-limit threshold and the upper-limit threshold, composite ratio K is set through linear interpolation thereof. In this case, linear interpolation is adopted. However, curve interpolation may be adopted.

Figure 6:
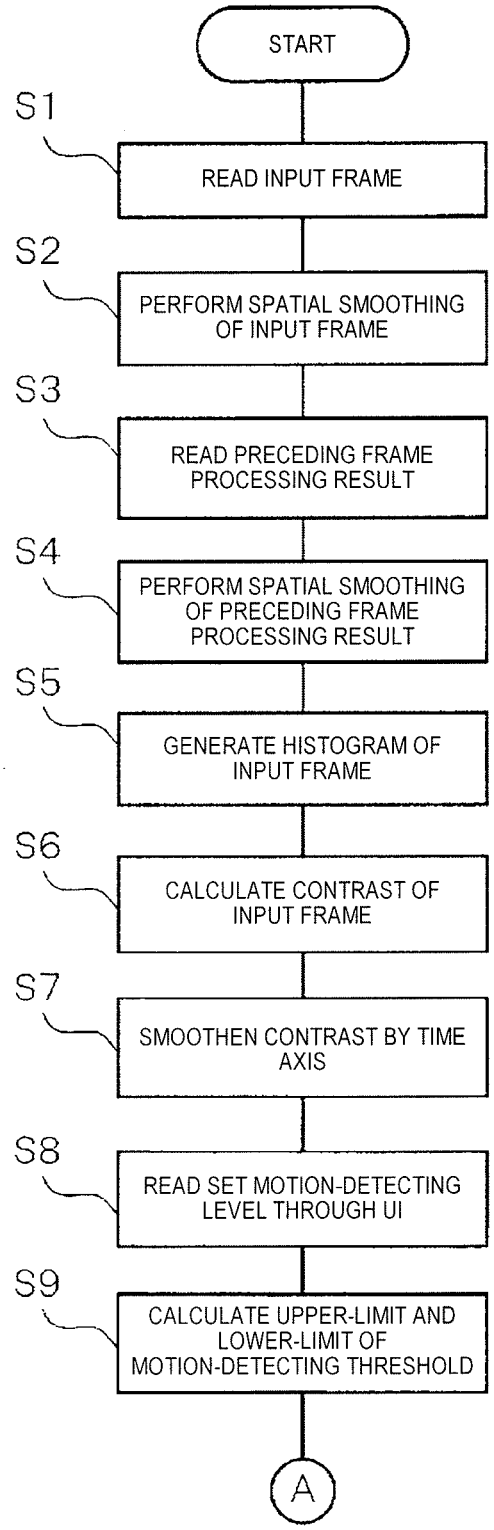
FIG. 6 is a flowchart describing a procedure of frame image processing.
Figure 7:
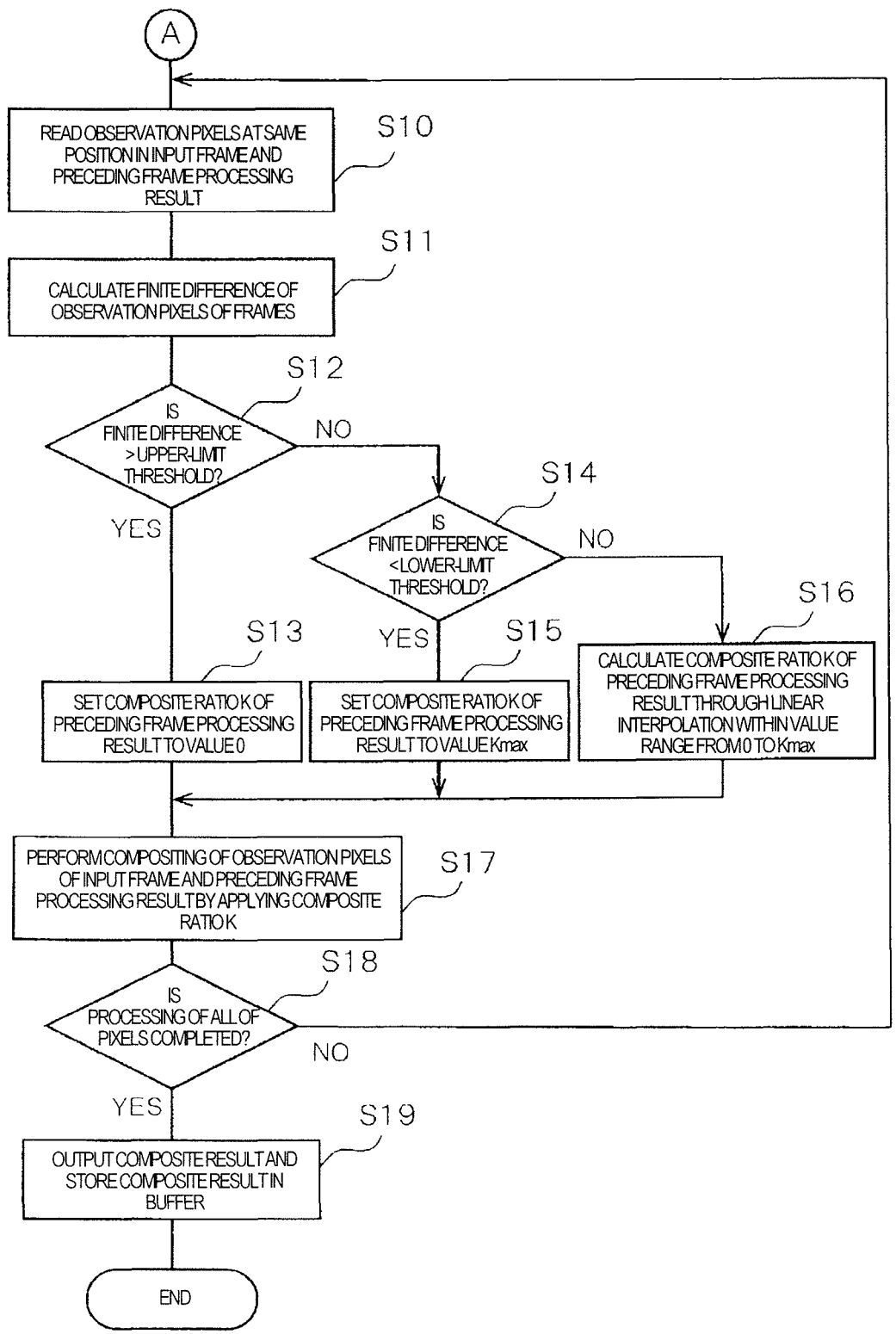
FIG. 7 is a flowchart describing a procedure of the frame image processing following that of FIG. 6.

An operation of image processing apparatus 1 having the above-described configuration will be described. FIGS. 6 and 7 are flowcharts respectively describing procedures of the frame image processing. Contrast analyzer 13 and smoothing processor 17 read an input frame image stored in memory 19 (S1). Smoothing processor 17 performs the two-dimensional low-pass filter processing for spatial smoothing with respect to the input frame image (S2). Moreover, smoothing processor 17 reads the processing result of the preceding frame image from frame buffer 18 (S3), and performs the two-dimensional low-pass filter processing for spatial smoothing (S4).

Contrast analyzer 13 generates a histogram of the input frame image (refer to FIG. 2) (S5), and calculates contrast of the input frame image from the histogram (S6). Moreover, contrast analyzer 13 smoothens the contrast by a time axis and calculates a contrast value (S7).

Motion-detecting threshold setter 12 reads the set motion-detecting level through UI 11 for the setting of motion-detecting level (S8). Motion-detecting threshold setter 12 calculates the lower-limit threshold and the upper-limit threshold of the motion-detecting threshold in accordance with Expression (1) by applying the reference value of the motion-detecting threshold obtained from the motion-detecting level and the contrast value calculated in Step S7 (S9).

Finite difference calculator 16 reads the pixel values of observation pixels at the same position in the input frame image and the preceding frame image after being subjected to the image processing (S10). Finite difference calculator 16 calculates the finite difference value of the observation pixels between frames (S11).

Motion detector 14 determines whether or not the finite difference value is greater than the upper-limit threshold (S12). In a case where the finite difference value is greater than the upper-limit threshold, motion detector 14 sets composite ratio K of the preceding frame image to the value 0 (S13). In other words, the observation pixel is determined to be moving considerably, and setting is thereby performed so as not to perform compositing of the preceding frame image.

Meanwhile, in a case where the finite difference value is equal to or less than the upper-limit threshold in Step S12, motion detector 14 determines whether or not the finite difference value is less than the lower-limit threshold (S14). In a case where the finite difference value is less than the lower-limit threshold, motion detector 14 sets composite ratio K of the preceding frame image to value Kmax (S15). In other words, the observation pixel is determined to be stationary, and setting is thereby performed so as to perform compositing of the preceding frame image after being subjected to the image processing at the maximum ratio.

Meanwhile, in a case where the finite difference value is equal to or greater than the lower-limit threshold in Step S14, motion detector 14 sets composite ratio K of the preceding frame image to a value corresponding to the finite difference value calculated through interpolation between the value 0 and value Kmax (refer to FIG. 5) (S16). In other words, setting is performed so as to perform compositing of the preceding frame image with respect to the input frame image at a ratio corresponding to a state of motion of the observation pixel.

When composite ratio K is set through Step S13, S15, or S16, image-composite processor 15 performs compositing of the observation pixels of the input frame image and the preceding frame image by applying composite ratio K (S17).

Image processing apparatus 1 determines whether or not compositing processing is completed with respect to all of the pixels in the input frame image (S18). In a case where the compositing processing is not completed with respect to all of the pixels, image processing apparatus 1 returns to the processing of Step S10 and performs similar processing with respect to the next observation pixel.

Meanwhile, in a case where the compositing processing is completed with respect to all of the pixels, image-composite processor 15 stores the composite image (composite result) in memory 19 as an output frame image and stores the composite image in frame buffer 18 as a preceding frame image for the next processing (S19). Thereafter, image processing apparatus 1 ends the processing.

As described above, in image processing apparatus 1 according to the first exemplary embodiment, the motion-detecting threshold automatically varies in accordance with the contrast of the input frame image. Therefore, it is easy to detect a mobile object even though the contrast fluctuates between the frames. Accordingly, it is possible to reduce an after-image of the mobile object in an image after being subjected to compositing even in a case where the contrast fluctuates, by lowering the ratio of the preceding frame image subjected to compositing with respect to the input frame image having a pixel or an area where the mobile object is detected.

In addition, when a user performs an input-operation of the motion-detecting level through the UI for the setting of motion-detecting level, the composite ratio of the input frame image and the preceding frame image is adjusted. Thus, the intention of a user can be reflected in the composite image.

Second Exemplary Embodiment

In a second exemplary embodiment, a case where an input frame image is divided into multiple areas and contrast is calculated for each of the divided areas will be described. An image processing apparatus according to the second exemplary embodiment has substantially the same configuration as that of the first exemplary embodiment. The same reference numerals and signs will be applied to the same configuration elements as those of the first exemplary embodiment, and description thereof will be omitted.

Figure 8:
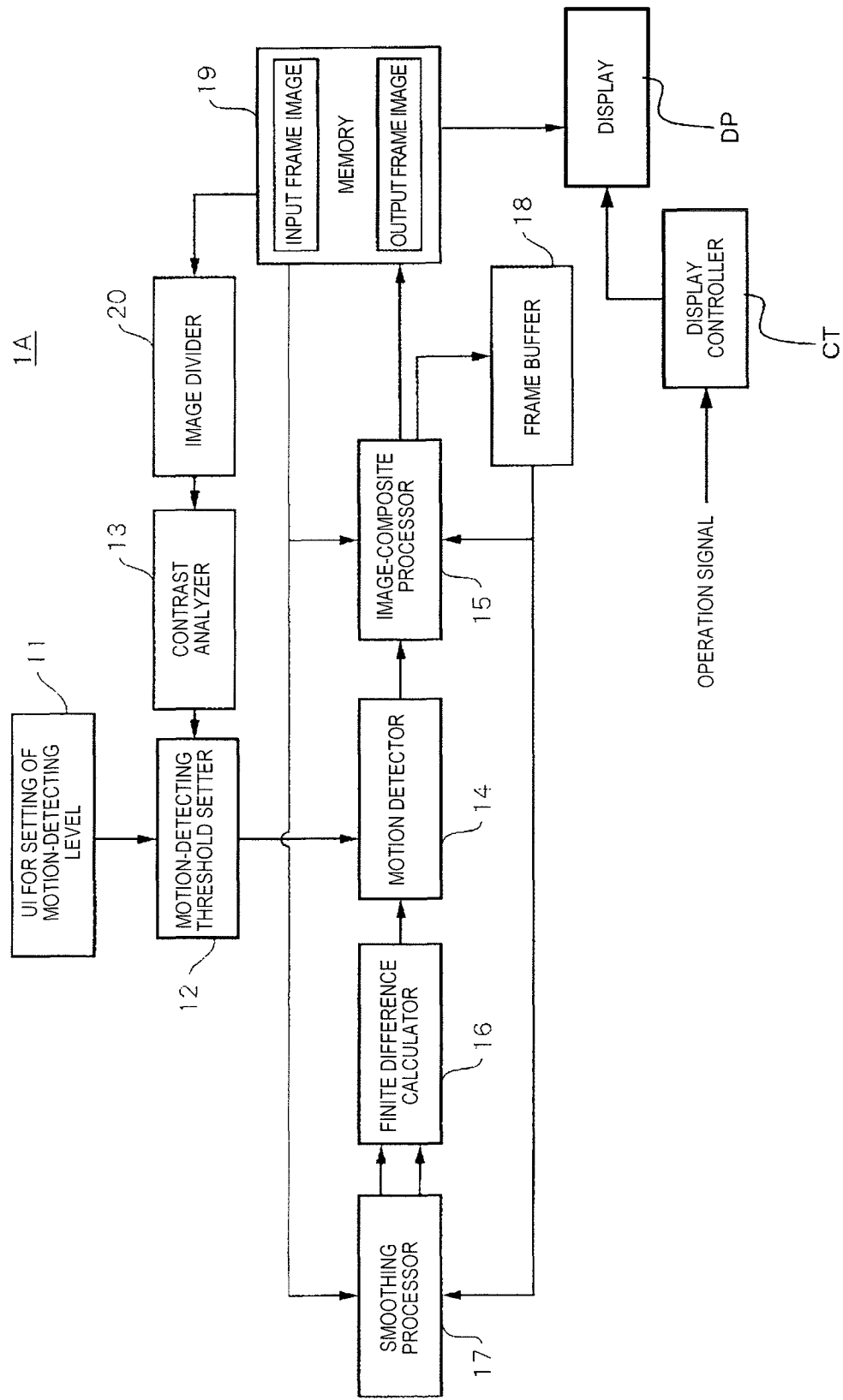
FIG. 8 is a block diagram illustrating a configuration of an image processing apparatus, according to a second exemplary embodiment.

FIG. 8 is a block diagram illustrating a configuration of image processing apparatus 1A, according to the second exemplary embodiment. Image processing apparatus 1A has a configuration similar to that of the first exemplary embodiment, and additionally has image divider 20.

Image divider 20 divides the input frame image into multiple areas. In this dividing method, for example, an image may be divided into blocks having the same sizes, or an image may be divided into areas by analyzing a motion vector or luminance distribution in the image and grouping the analyzed result.

Contrast analyzer 13 calculates contrast for each area, and motion-detecting threshold setter 12 sets the motion-detecting threshold by using the contrast for each area.

Figure 9A:
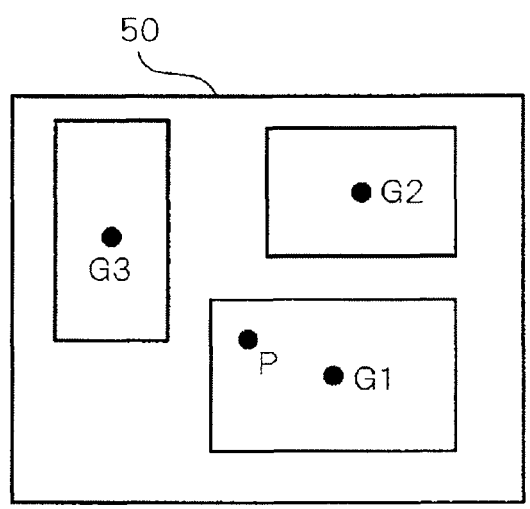
FIG. 9A is a view describing setting of a threshold with respect to an observation pixel in an image divided into multiple areas.
Figure 9B:
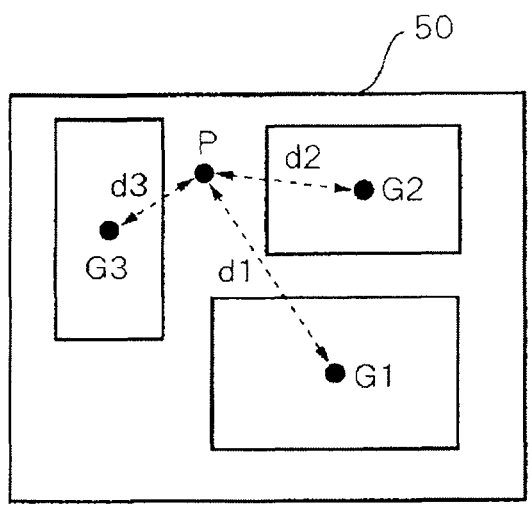
FIG. 9B is a view describing the setting of a threshold with respect to an observation pixel in an image divided into multiple areas.

FIGS. 9A and 9B are views describing setting of a threshold with respect to an observation pixel in an image divided into multiple areas. Input frame image 50 includes three divided areas G1, G2, and G3. In areas G1, G2, and G3, motion-detecting thresholds Thd (G1), Thd (G2), and Thd (G3) are set so as to correspond to the contrast.

In FIG. 9A, observation pixel P belongs to area G1. Therefore, motion-detecting threshold Thd (P) of observation pixel P becomes motion-detecting threshold Thd (G1) of area G1.

Meanwhile, in FIG. 9B, observation pixel P is located outside the divided areas G1, G2, and G3. Motion-detecting threshold Thd (P) of observation pixel P may be set to motion-detecting threshold Thd (G3) of area G3 closest to observation pixel P.

In addition, motion-detecting threshold Thd (P) of observation pixel P may be set to an interpolation value which is calculated through Expression (2) by applying motion-detecting thresholds Thd (G1), Thd (G2), and Thd (G3) of the multiple areas (here, areas G1, G2, and G3) on the periphery of observation pixel P.

[Expression 2]

$$Thd(P)=[(Thd(G1)/d1)+(Thd(G2)/d2)+(Thd(G3)/d3)]/[(1/d1)+(1/d2)+(1/d3)] \quad (2)$$

Here, d1, d2, and d3 respectively indicate distances from observation pixel P to the centers of gravity in areas G1, G2, and G3.

In a case where the observation pixel is located on the boundary of an area, in order to reduce a rapid change of the motion-detecting threshold, the two-dimensional low-pass filter processing may be performed with respect to the distribution of the motion-detecting thresholds, and the motion-detecting threshold of the observation pixel may be calculated.

Figure 10:
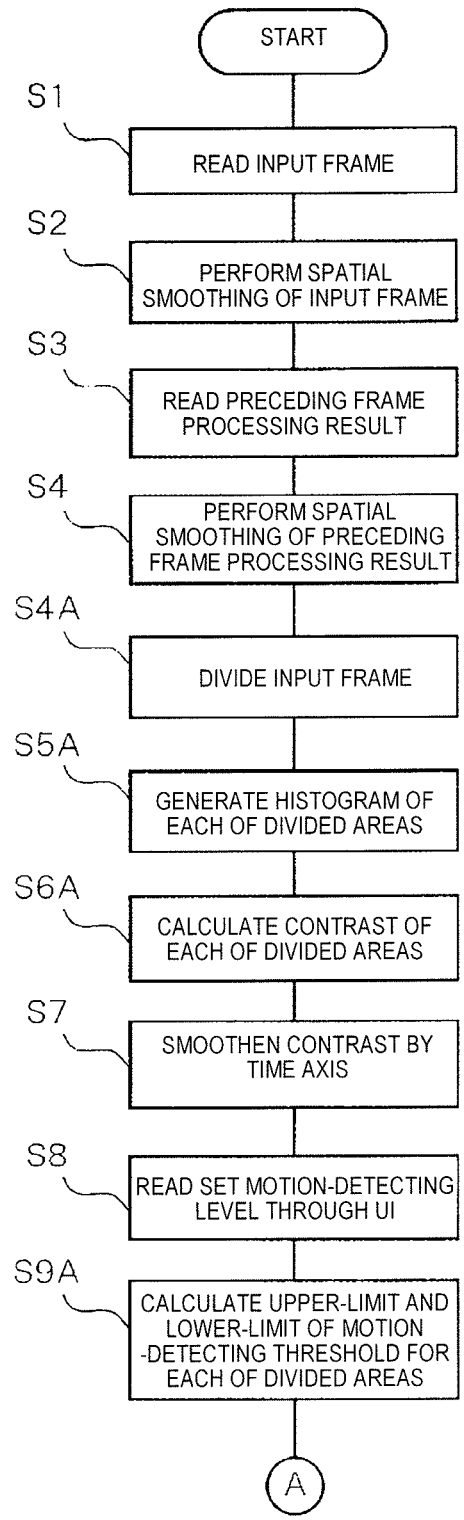
FIG. 10 is a flowchart describing a procedure of the frame image processing.

FIG. 10 is a flowchart describing a procedure of the frame image processing. The processing after Step S10 is the same as that of the first exemplary embodiment, and thus, the processing thereafter will be omitted. In addition, here, processing of steps different from those of the first exemplary embodiment will be described.

In Step S4, smoothing processor 17 performs the two-dimensional low-pass filter processing for spatial smoothing with respect to the preceding frame image read from frame buffer 18.

Thereafter, image divider 20 sets multiple divided areas in the input frame image (S4A). Contrast analyzer 13 generates a histogram for each of the divided areas (S5A), and calculates contrast for each of the divided areas based on the histogram (S6A).

In Step S8, when the set motion-detecting level is read through UI 11 for the setting of motion-detecting level, motion-detecting threshold setter 12 calculates the lower-limit threshold and the upper-limit threshold of the motion-detecting threshold for each of the divided areas in accordance with Expression (1) referenced above, by applying the reference value of the motion-detecting threshold obtained from the motion-detecting level and the contrast value calculated in Step S7 (S9A).

As described above, in image processing apparatus 1A according to the second exemplary embodiment, the motion-detecting threshold automatically varies for each of the divided areas in the input frame image in accordance with the contrast thereof. Accordingly, even though the contrast fluctuates in one input frame image, the mobile object is easily detected. Accordingly, even though an area of low contrast and an area of high contrast are mixedly present in the input frame image, it is possible to reduce the after-image of the mobile object.

Third Exemplary Embodiment

In a third exemplary embodiment, a case where a user sets an area and contrast in an input frame image will be described. Image processing apparatus 1B according to the third exemplary embodiment has substantially the same configuration as that of the first exemplary embodiment. The same reference numerals and signs will be applied to the same configuration elements as those of the first exemplary embodiment, and description thereof will be omitted.

Figure 11:
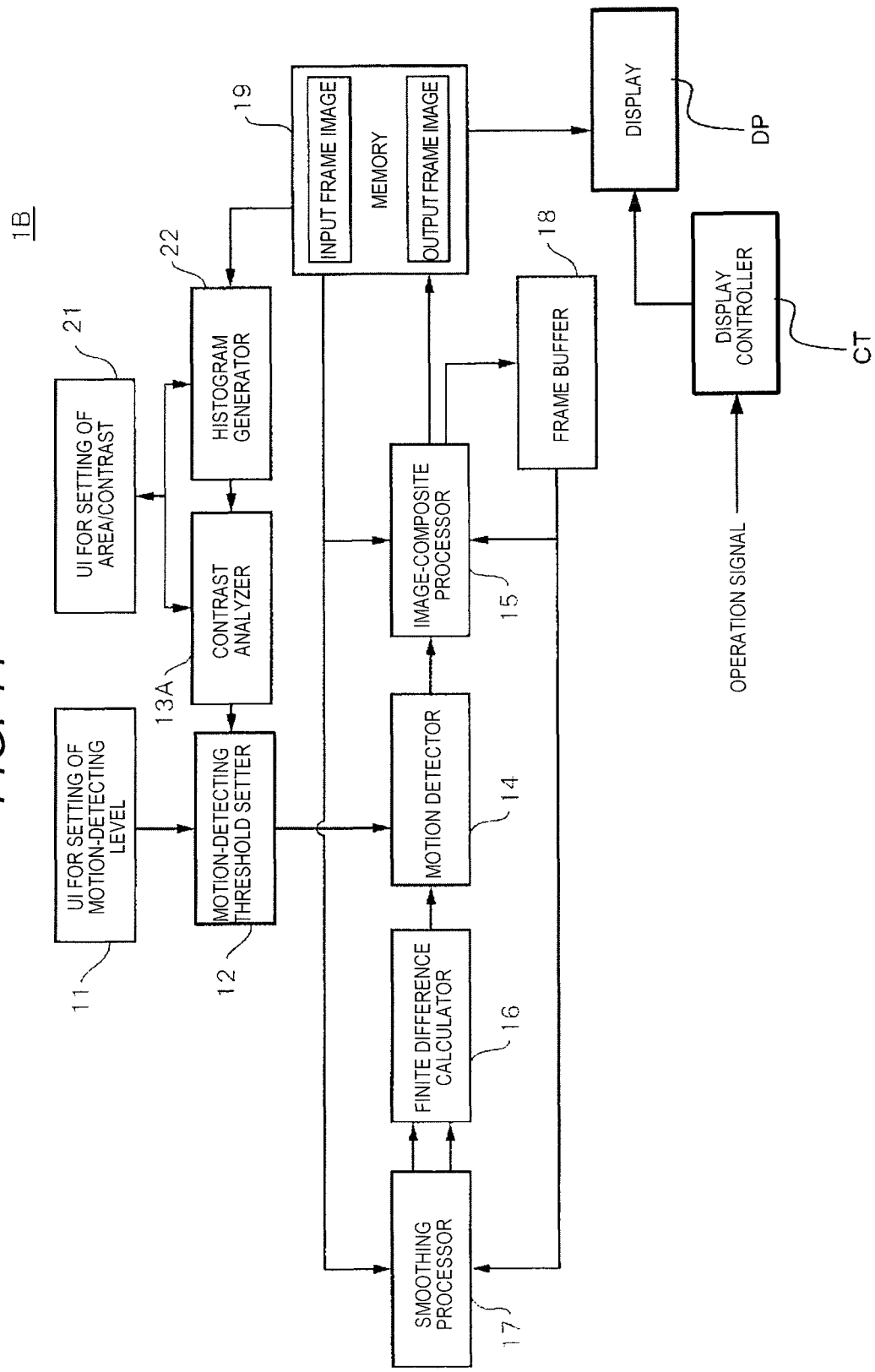
FIG. 11 is a block diagram illustrating a configuration of an image processing apparatus, according to a third exemplary embodiment.

FIG. 11 is a block diagram illustrating a configuration of image processing apparatus 1B, according to the third exemplary embodiment. In addition to the configuration of the first exemplary embodiment, image processing apparatus 1B has UI 21 for setting of area/contrast, histogram generator 22, and contrast setter 13A replacing contrast analyzer 13.

UI 21 for the setting of area/contrast is used for selecting an observation area and setting the contrast, and has a display which can display a histogram, and an input-operation processor. For example, UI 21 for the setting of area/contrast is configured to have input devices such as a touch panel or a display, and a mouse.

Histogram generator 22 generates a histogram of the observation area designated by a user. Contrast setter 13A sets the contrast of the observation area designated by the user.

The user designates the observation area (a predetermined area) with reference to a representative frame image and a histogram thereof which the screen (refer to FIG. 13) of UI 21 for the setting of area/contrast displays. Information of the designated observation area is input to histogram generator 22. When histogram generator 22 generates a histogram of the observation area, UI 21 for the setting of area/contrast displays the histogram of the observation area by causing the histogram thereof to overlap the histogram of the representative frame.

Moreover, the user designates the accumulated lower limit and the accumulated upper limit of the area with reference to the histogram of the observation area, and thus, the designated accumulated lower limit and the designated accumulated upper limit are input to contrast setter 13A. Contrast setter 13A calculates the contrast of the observation area based on the input information of the accumulated lower limit and the accumulated upper limit.

The user selects multiple observation areas and designates contrast of each area. The contrast set for each of the observation areas is input to motion-detecting threshold setter 12.

Figure 12:
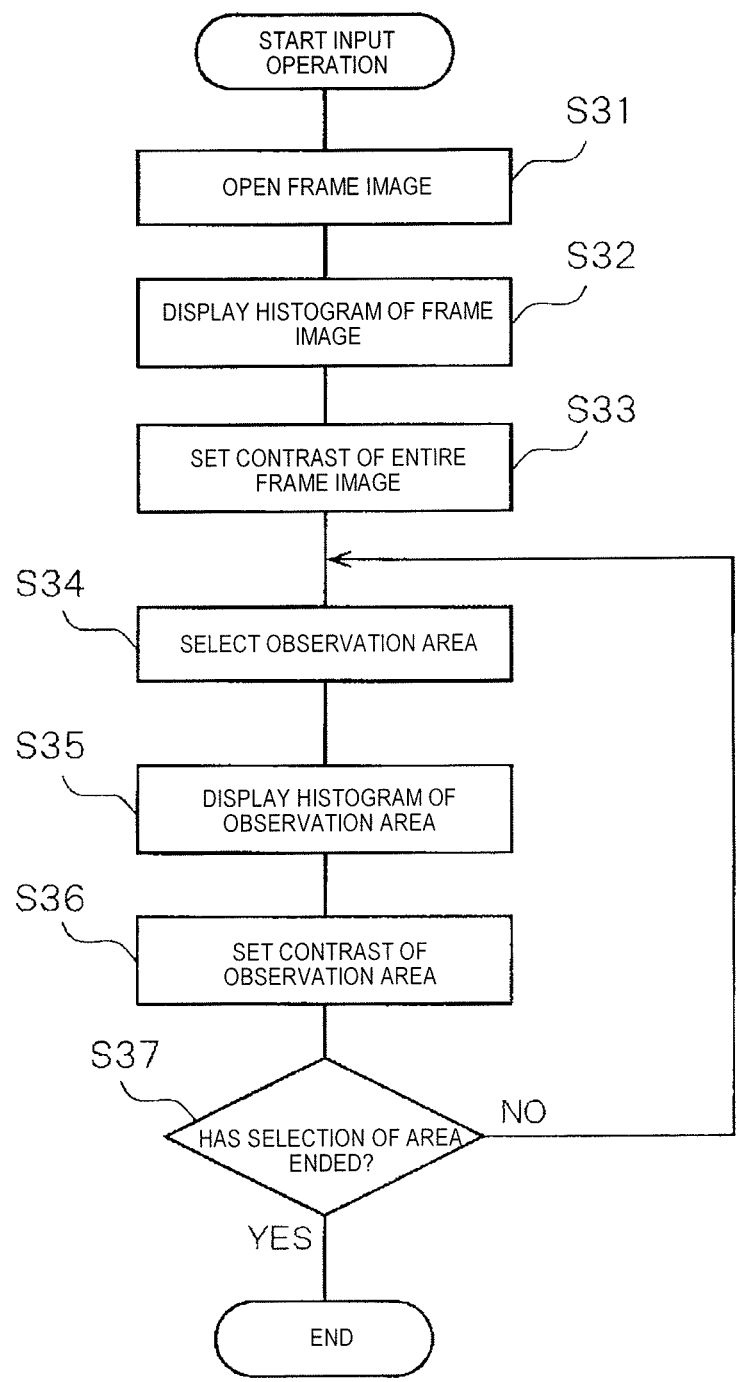
FIG. 12 is a flowchart describing a procedure of an input-operation of a UI for setting of area/contrast.

FIG. 12 is a flowchart describing a procedure of an input-operation of UI 21 for the setting of area/contrast. FIGS. 13A to 13F are views respectively illustrating the screens of UI 21 for the setting of area/contrast.

Figure 13A:
FIG. 13A is a view illustrating a screen of the UI for the setting of area/contrast.

First, UI 21 for the setting of area/contrast opens input frame image 50 (S31). When input frame image 50 is opened, as illustrated in FIG. 13A, the screen of UI 21 for the setting of area/contrast displays input frame image 50.

Figure 13B:
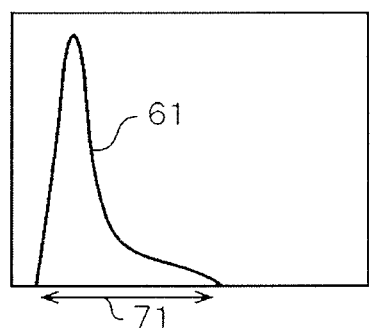
FIG. 13B is a view illustrating the screen of the UI for the setting of area/contrast.

Moreover, histogram generator 22 generates histogram 61 corresponding to all of the areas in input frame image 50. As illustrated in FIG. 13B, UI 21 for the setting of area/contrast causes the screen to display generated histogram 61 corresponding to all of the areas (S32).

Contrast setter 13A sets contrast 71 of histogram 61 (S33). For example, contrast 71 is set by performing designation such that the accumulated lower limit and the accumulated upper limit respectively become 2% and 98% of the total number of pixels.

Figure 13C:
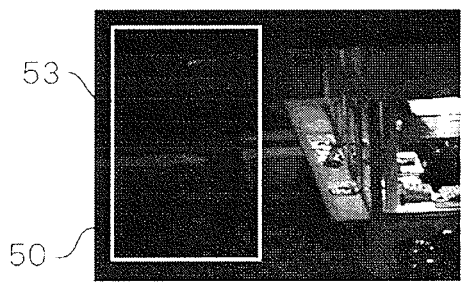
FIG. 13C is a view illustrating the screen of the UI for the setting of area/contrast.
Figure 13D:
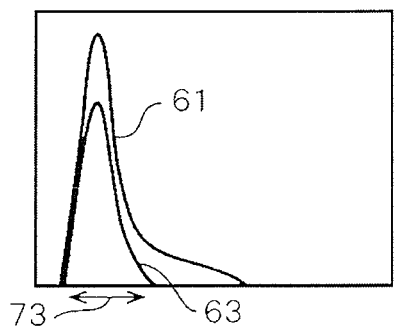
FIG. 13D is a view illustrating the screen of the UI for the setting of area/contrast.

UI 21 for the setting of area/contrast receives observation area 53 in the input frame image selected by the user (S34). As illustrated in FIG. 13C, when observation area 53 is selected, histogram generator 22 generates histogram 63 corresponding to observation area 53. As illustrated in FIG. 13D, UI 21 for the setting of area/contrast causes the screen to display generated histogram 63 corresponding to observation area 53 by causing generated histogram 63 to overlap histogram 61 corresponding to all of the areas (S35).

Contrast setter 13A sets contrast 73 of histogram 63 (S36). For example, contrast 73 is set by performing designation such that the accumulated lower limit and the accumulated upper limit respectively become 2% and 98% of the total number of pixels.

UI 21 for the setting of area/contrast determines whether or not selection of all of the observation areas is completed (S37). In a case where selection of all of the observation areas is not completed, UI 21 for the setting of area/contrast returns to the processing of Step 34 and performs similar processing.

Figure 13E:
FIG. 13E is a view illustrating the screen of the UI for the setting of area/contrast.
Figure 13F:
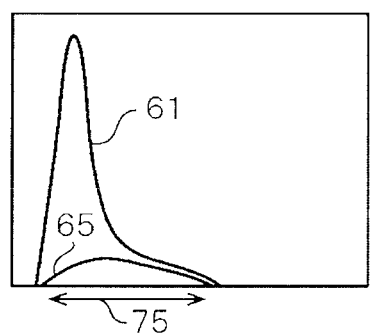
FIG. 13F is a view illustrating the screen of the UI for the setting of area/contrast.

As illustrated in FIG. 13E, when second observation area 55 is selected, UI 21 for the setting of area/contrast receives observation area 55 in the input frame image selected by the user (S34). As illustrated in FIG. 13F, histogram generator 22 generates histogram 65 corresponding to observation area 55, and UI 21 for the setting of area/contrast causes the screen to display generated histogram 65 corresponding to observation area 55 by causing generated histogram 65 to overlap histogram 61 corresponding to all of the areas (S35).

Contrast setter 13A sets contrast 75 of histogram 65 (S36). For example, contrast 75 is set by performing designation such that the accumulated lower limit and the accumulated upper limit respectively become 2% and 98% of the total number of pixels.

Observation area 53 selected first is an area which is generally dark, and thus, contrast 73 becomes a small value. Meanwhile, observation area 55 selected second is an area having light and shade, and thus, contrast 75 becomes a significant value.

Figure 14:
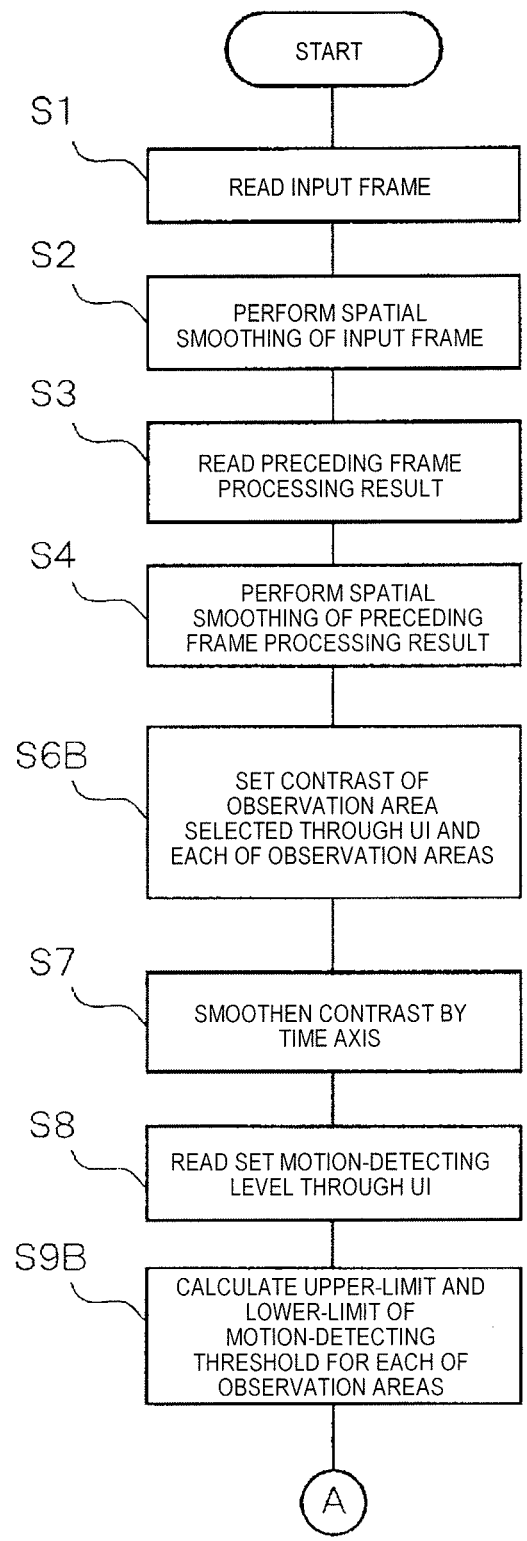
FIG. 14 is a flowchart describing a procedure of the frame image processing.

FIG. 14 is a flowchart describing a procedure of the frame image processing. The processing after Step S10 is the same as that of the first exemplary embodiment, and thus, the processing thereafter will be omitted. In addition, here, processing of steps different from those of the first exemplary embodiment will be described.

In Step S4, smoothing processor 17 performs the two-dimensional low-pass filter processing for spatial smoothing with respect to the preceding frame image read from frame buffer 18.

Thereafter, UI 21 for the setting of area/contrast sets the observation area selected by the user and the contrast corresponding to the observation area thereof, in accordance with the procedure illustrated in FIG. 12 (S6B).

In Step S8, when the set motion-detecting level is read through UI 11 for the setting of motion-detecting level, motion-detecting threshold setter 12 calculates the lower-limit threshold and the upper-limit threshold of the motion-detecting threshold for each of the selected observation areas in accordance with Expression (1) referenced above, by applying the reference value of the motion-detecting threshold obtained from the motion-detecting level and the contrast value calculated in Step S7 (S9B).

As described above, in image processing apparatus 1B according to the third exemplary embodiment, it is possible for a user to select the observation area with reference to the input frame image and to designate the contrast used when calculating the motion-detecting threshold of the observation area as well.

Accordingly, even though an area of low contrast and an area of high contrast are mixedly present in the input frame image, it is easy to detect a mobile object while the intention of a user is sufficiently reflected. It is possible to reduce an after-image of the mobile object as intended by a user, by lowering the ratio of the preceding frame image subjected to compositing with respect to the input frame image having an observation area where the mobile object is detected.

The user does not have to perform all the designation of the observation area and the setting of the contrast. As described in the second exemplary embodiment, the user may perform designation and setting by correcting the automatically divided area and the set contrast while referring to the result thereof.

Hereinbefore, various types of exemplary embodiments have been described with reference to the drawings. However, it is needless to mention that the present invention is not limited to the examples thereof. It is well understood by those skilled in the art that various changed examples and modification examples can be made within the scope disclosed in Claims. Naturally, the examples are considered to be included in the technical scope of the present invention.

For example, display controller CT of image processing apparatus 1, 1A, or 1B in each exemplary embodiment may read out image data of a video image stored in memory 19 and display DP may display a menu screen of image compositing (hereinafter, referred to as "multiple-image compositing NR") processing of a preceding frame image in which composite ratio K of each exemplary embodiment is applied and an input frame image (a current frame image), and image data of the video image read out from memory 19, on the same screen (refer to FIGS. 15 to 20). Even though description is omitted in each of the above-described exemplary embodiments, each image processing apparatus 1, 1A, or 1B may be additionally provided with display DP for displaying the screen and display controller CT for controlling the displaying of display DP (refer to FIGS. 1, 8, and 11). Hereinafter, screen examples displayed on same screens WD1 to WD6 of display DP will be described with reference to FIGS. 15 to 20.

Figure 15:
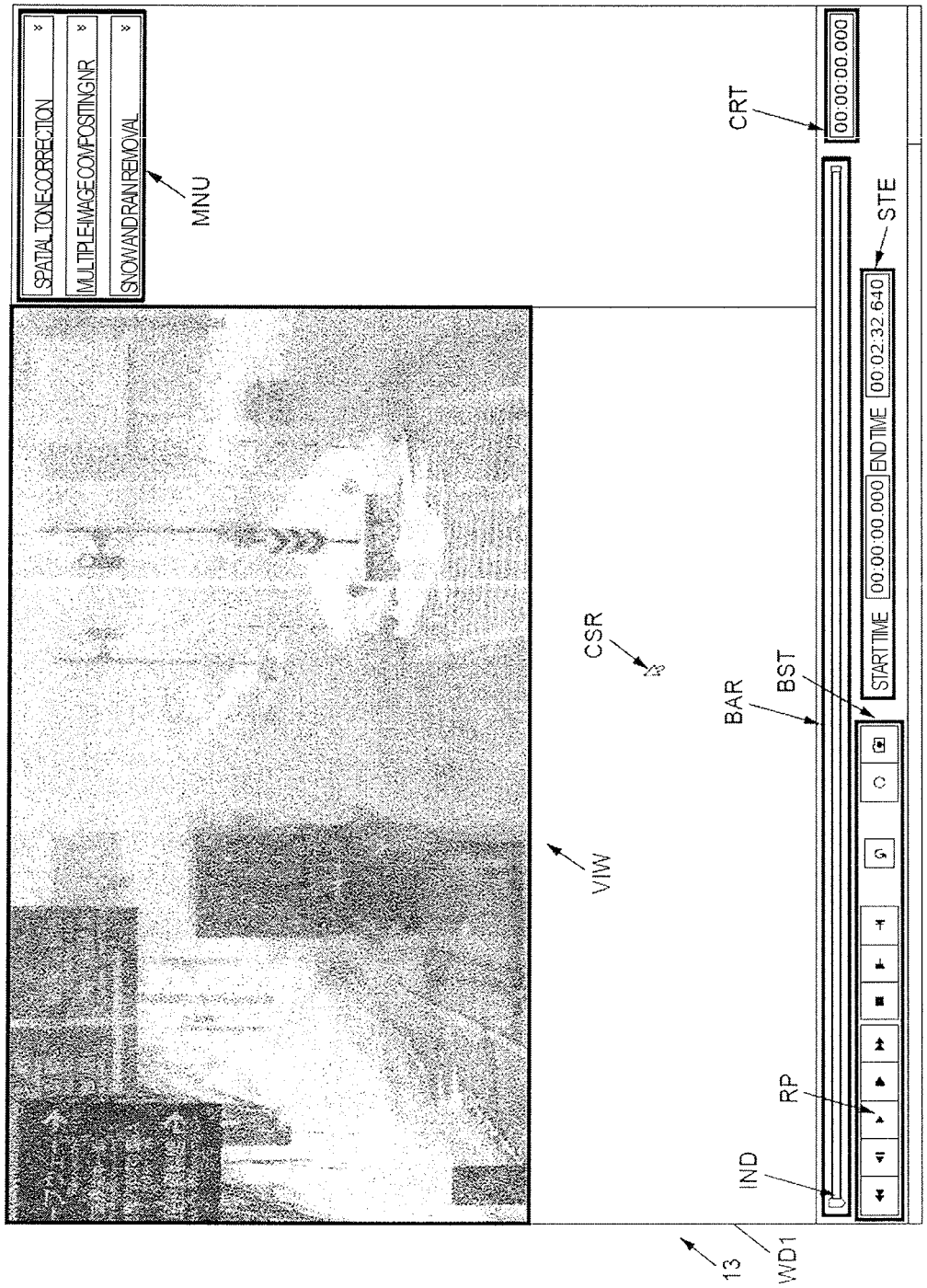
FIG. 15 is a view illustrating a display example in which a display area of a viewer of a video image and a display area of an image processing menu are displayed on the same screen showing a video image immediately before being reproduced.
Figure 16:
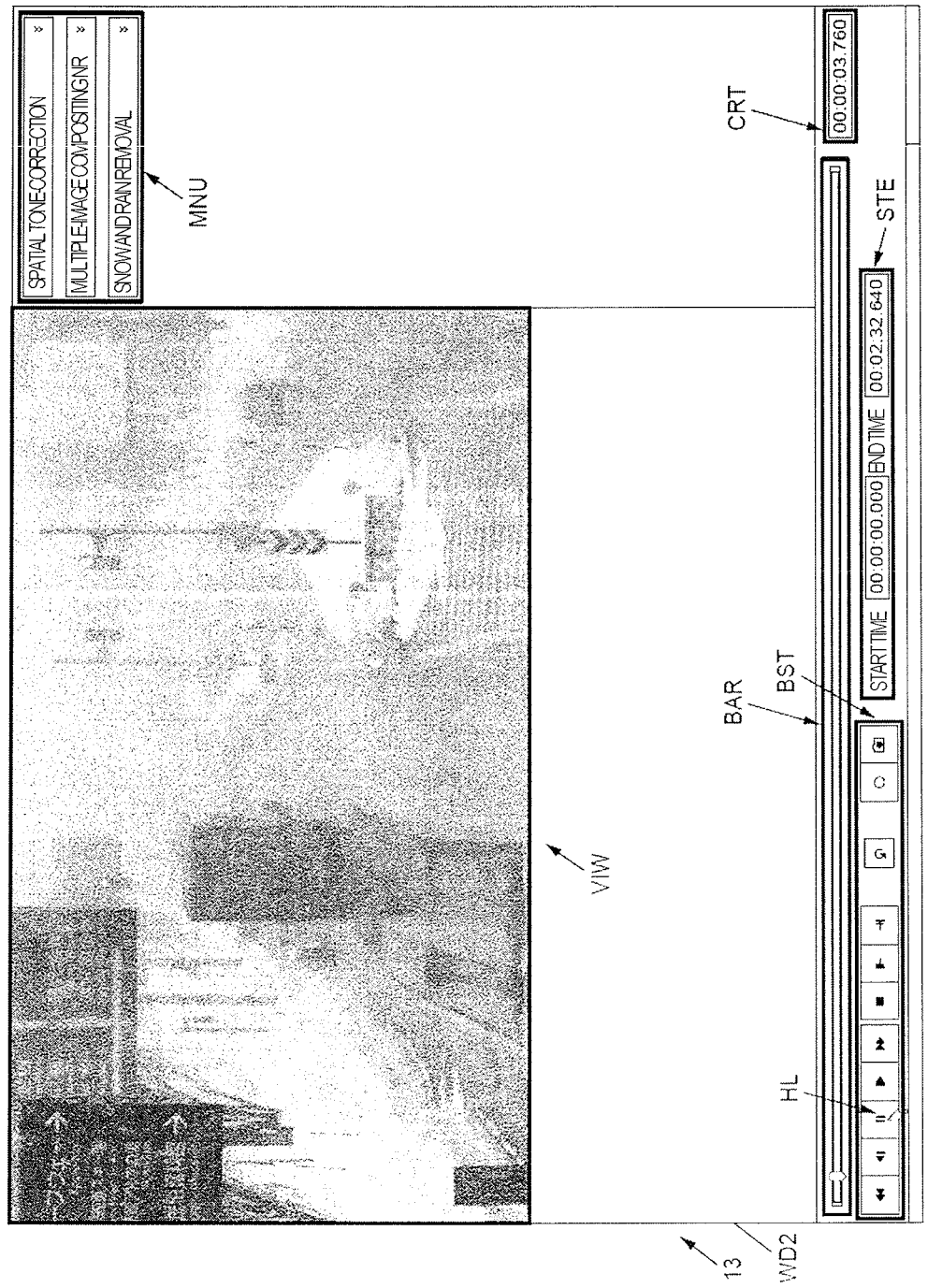
FIG. 16 is a view illustrating a display example in which the display area of the viewer of a video image and the display area of the image processing menu are displayed on the same screen showing a video image immediately after being reproduced.
Figure 17:
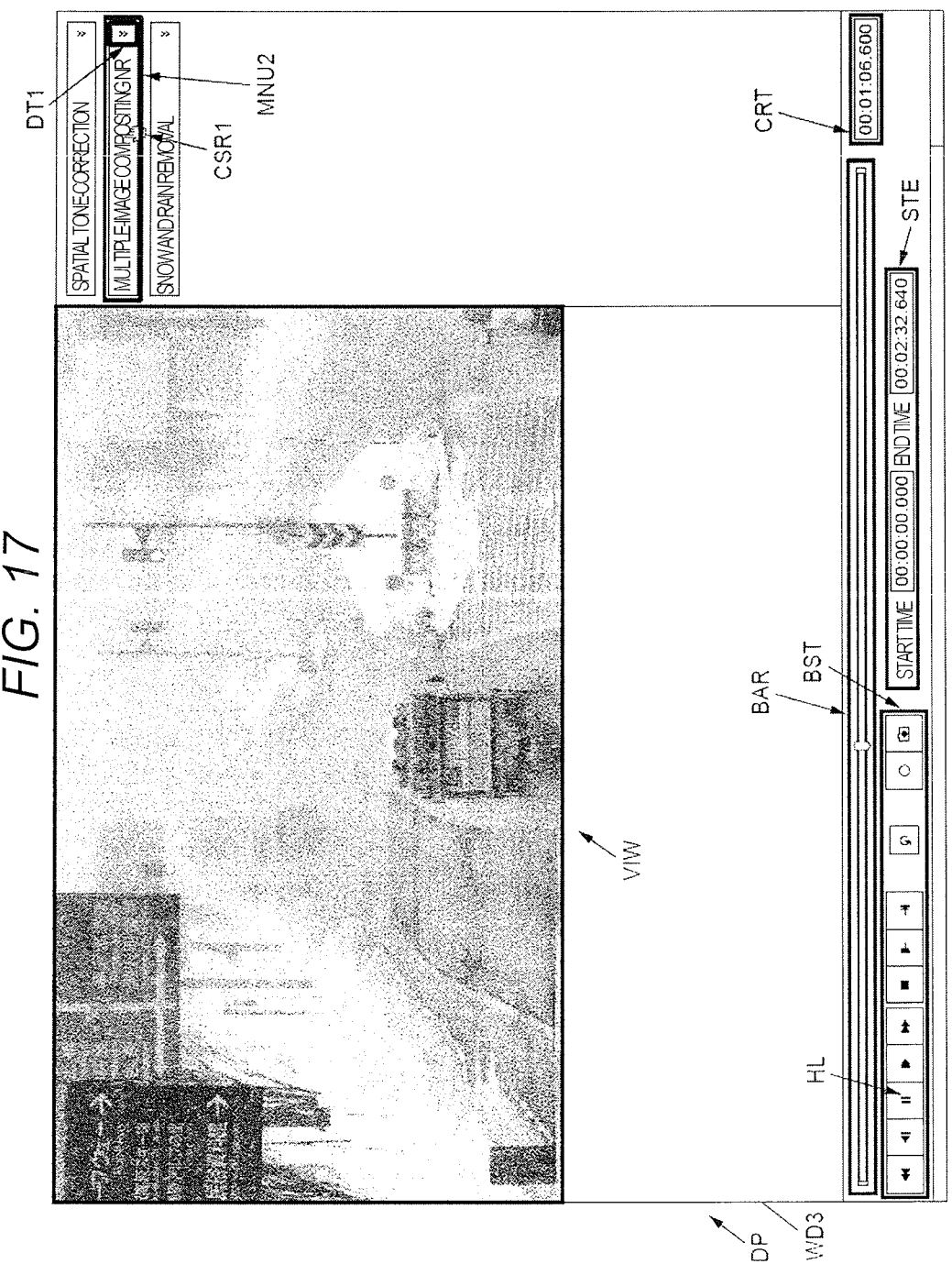
FIG. 17 is a view illustrating a display example in which the display area of the viewer of a video image and the display area of the image processing menu are displayed on the same screen showing a video image after being subjected to multiple-image compositing NR processing.

FIG. 15 is a view illustrating a display example in which display area VIW of a viewer of a video image and display area MNU of an image processing menu are displayed on same screen WD1 showing a video image immediately before being reproduced. FIG. 16 is a view illustrating a display example in which display area VIW of the viewer of a video image and display area MNU of the image processing menu are displayed on same screen WD2 showing a video image immediately after being reproduced. FIG. 17 is a view illustrating a display example in which display area VIW of the viewer of a video image and display area MNU of the image processing menu are displayed on same screen WD3 showing a video image after being subjected to the multiple-image compositing NR processing.

In FIG. 15, display area VIW of the viewer of the image data of the video image when being read out from memory 19 in a state immediately before being reproduced, and display area MNU of the menu (the image processing menu) of the image processing (specifically, spatial tone correction, multiple-image compositing noise reduction (NR), and snow and rain removal) which can be executed by image processing apparatus 1, 1A, or 1B are shown on same screen WD1. In FIG. 15, detailed contents of each image processing menu are not shown, and only the name of each image processing menu is shown. Therefore, it is possible for a user to visually recognize a relationship between the image data of the video image which becomes a target of the image processing in image processing apparatus 1, 1A, or 1B, and the list of the menu of the image processing which can be executed by image processing apparatus 1, 1A, or 1B, at a glance. Accordingly, it is possible for a user to contrastively check the image data of the video image which becomes a target of the image processing and the image processing menu.

At the bottom portion of screens WD1 to WD6 illustrated in FIGS. 15 to 20, operation button set BST related to operations such as reproduce, pause, stop, fast-forward, rewind, record, and reverse of a video image; reproduction bar BAR visually showing a reproduction time of a video image; video image time area STE showing a start time and an end time of a video image; and reproduction time area CRT directly showing an actual reproduction time (that is, an elapsed time from the start time) indicated by indicator IND displayed within reproduction bar BAR are displayed together. When a user performs an operation in which reproduce button RP is pressed by cursor CSR, display controller CT of image processing apparatus 1 reproduces the image data of the video image read out from memory 19 (refer to FIGS. 16 to 21). In this case, display controller CT of image processing apparatus 1 performs displaying on screen WD2 by changing reproduce button RP to pause button HL.

Here, when a user performs an operation in which menu bar MNU2 of the multiple-image compositing NR in display area MNU of the image processing menu is pressed once by cursor CSR, for example, image-composite processor 15 of image processing apparatus 1, 1A, or 1B performs the processing of the multiple-image compositing NR with respect to the image data of the video image displayed in display area VIW in accordance with a corresponding method of each exemplary embodiment (for example, refer to the set of FIGS. 6 and 7, the set of FIGS. 10 and 7, and the set of FIGS. 14 and 7 individually). Meanwhile, when menu bar MNU2 of the multiple-image compositing NR is pressed once again by cursor CSR, image-composite processor 15 of image processing apparatus 1, 1A, or 1B stops the processing of the multiple-image compositing NR with respect to the image data of the video image displayed in display area VIW. Accordingly, image processing apparatus 1, 1A, or 1B can unerringly execute or stop executing the image processing corresponding to any image processing menu displayed in display area MNU through a simple operation of a user (that is, the presence or absence of pressing menu bar MNU2) in a state where the image data of the video image displayed in display area VIW is reproduced, and thus, it is possible for a user to simply check the processing result before and after the image processing. In a case where cursor CSR is on any menu bar of the image processing menu or in the vicinity thereof, display controller CT of image processing apparatus 1, 1A, or 1B may display cursor CSR1 having a different shape or may display original cursor CSR.

Figure 18:
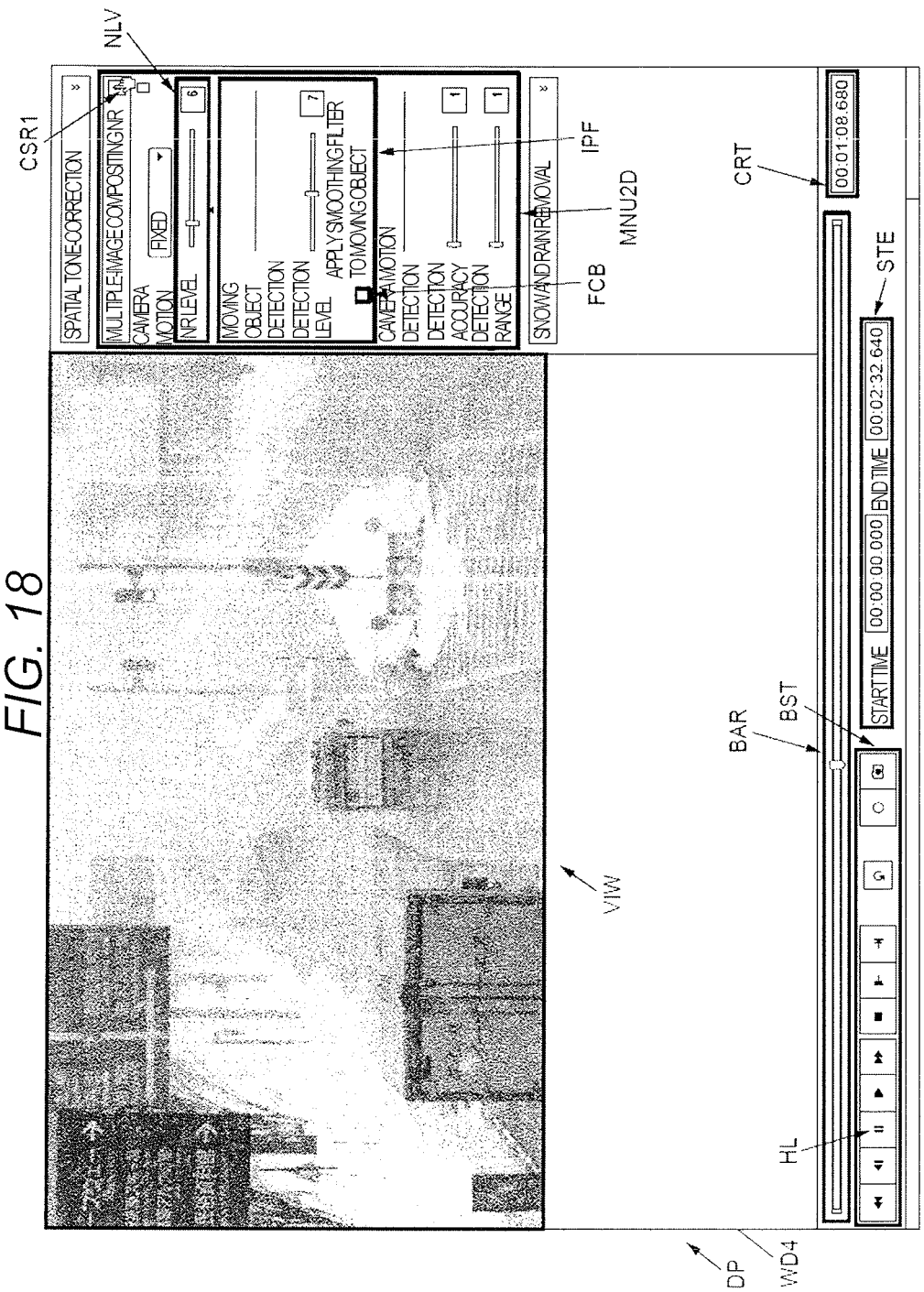
FIG. 18 is a view illustrating an example in which the display area of the viewer of a video image and the display area of the image processing menu are displayed on the same screen showing details of a multiple-image compositing NR menu.
Figure 19:
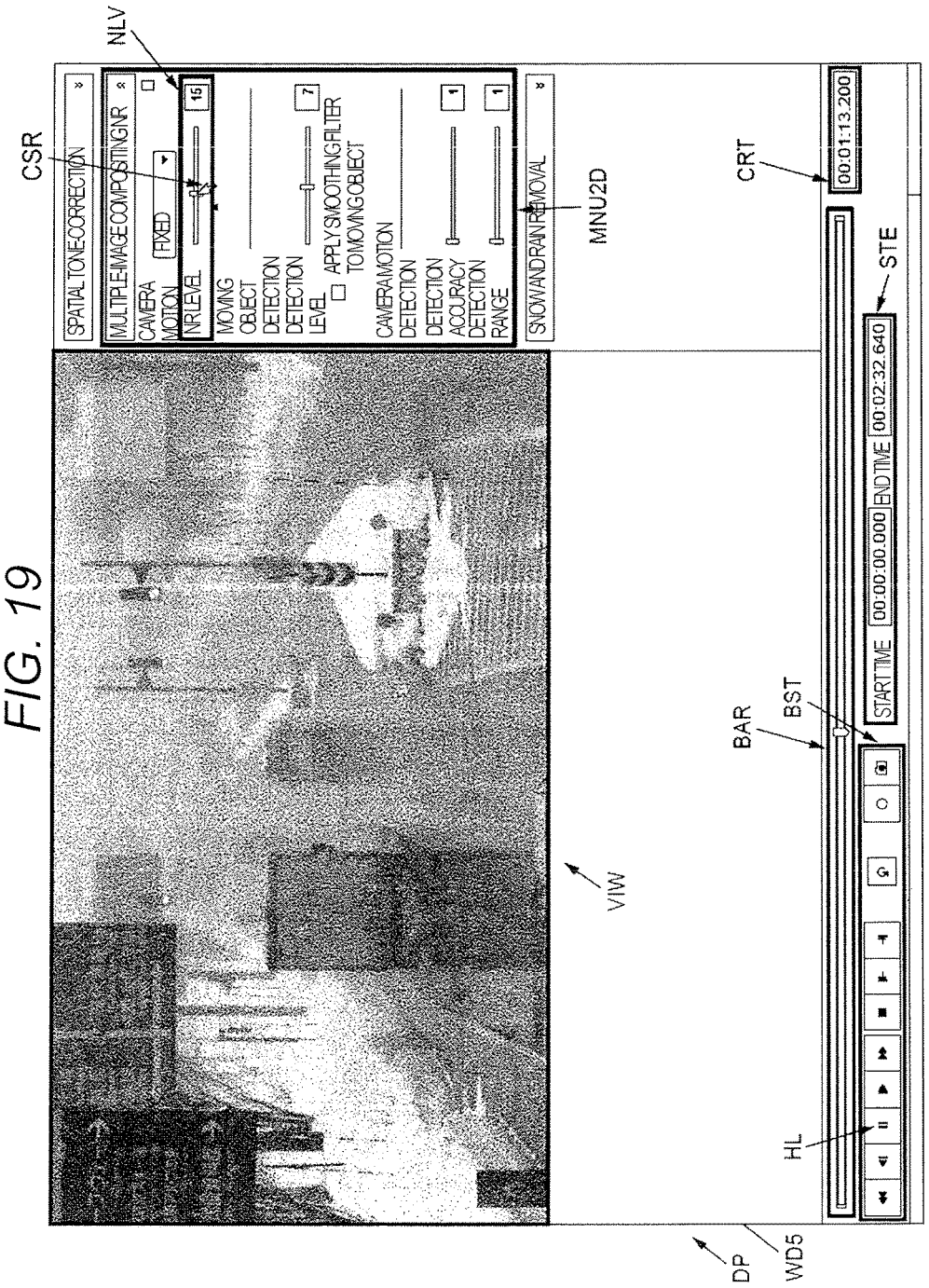
FIG. 19 is a view illustrating an example in which the display area of the viewer of a video image and the display area of the image processing menu are displayed on the same screen showing details of the multiple-image compositing NR menu.
Figure 20:
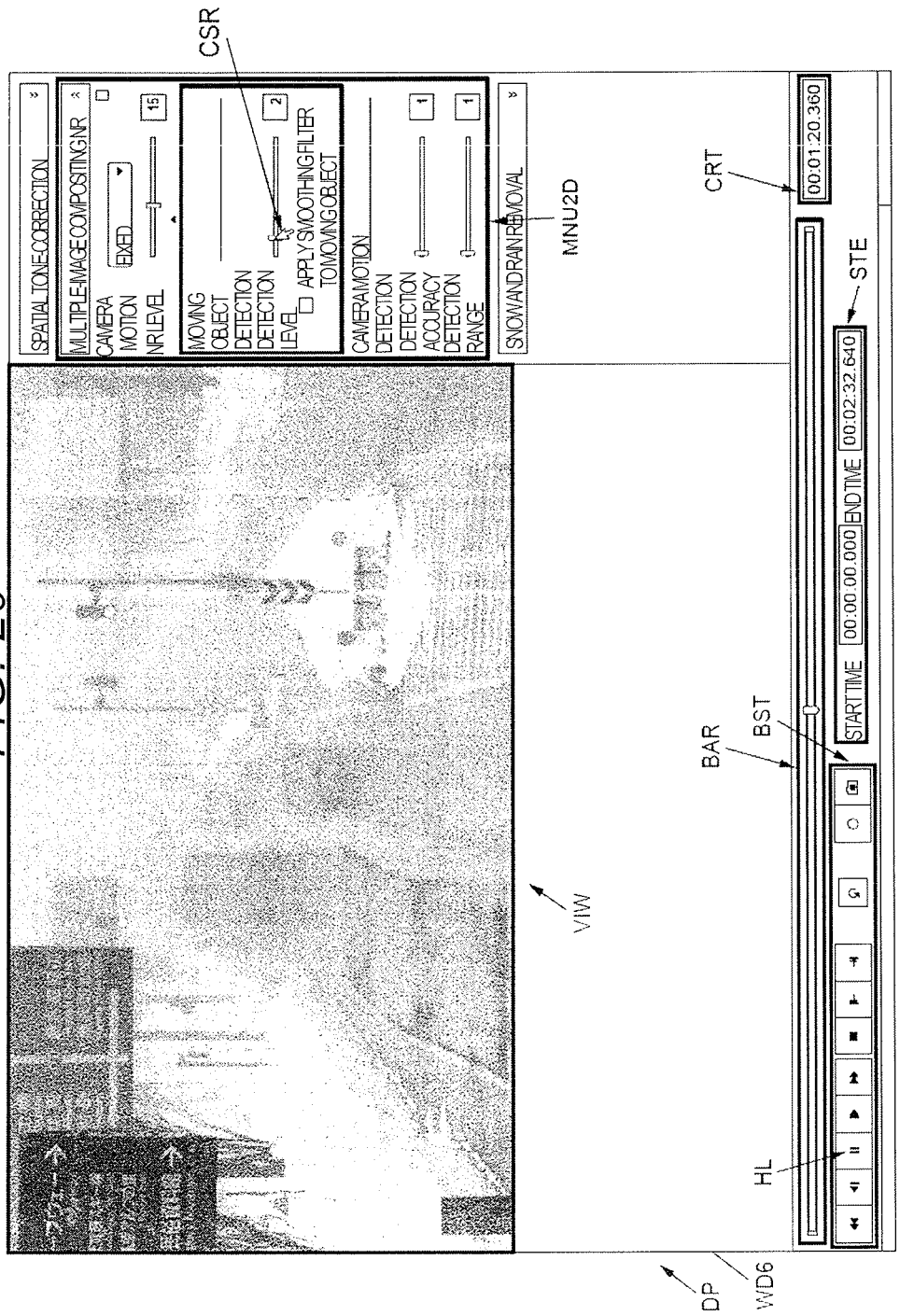
FIG. 20 is a view illustrating an example in which the display area of the viewer of a video image and the display area of the image processing menu are displayed on the same screen showing details of the multiple-image compositing NR menu.

In addition, when a user performs an operation in which marker DT1 displayed at the right end portion of menu bar MNU2 of the multiple-image compositing NR illustrated in FIG. 17 is pressed by cursor CSR1, display controller CT of image processing apparatus 1, 1A, or 1B deploys display area MNU2D of a detailed operation screen for setting multiple input parameters (for example, an NR level, and a detection level) related to the multiple-image compositing NR and displays the same on screen WD4 (refer to FIGS. 18 to 20). FIGS. 18 to 20 are views respectively illustrating examples in each of which display area VIW of the viewer of a video image and display area MNU2D of the image processing menu are displayed on each of same screens WD4 to WD6 showing details of the multiple-image compositing NR menu.

As illustrated in FIGS. 18 to 20, display controller CT of image processing apparatus 1, 1A, or 1B causes display area MNU2D to display a screen similar to the detailed operation screen (refer to FIG. 3) for setting the input parameters related to the multiple-image compositing NR. In display area MNU2D illustrated in FIGS. 18 to 20, a camera operation, the NR level, the detection level, checkbox FCB for determining whether or not a smoothing filter is applied to a moving object, and detection accuracy and detection range for detecting camera motion, which are the input parameters related to the multiple-image compositing NR are displayed so as to be able to be input or designated.

Similarly in FIGS. 18 to 20, when a user performs an operation in which cursor CSR is moved to the right and left with respect to a seek bar (for example, refer to slider 31a illustrated in FIG. 3) provided for each of the NR level, the detection level, and the detection accuracy and the detection range, image processing apparatus 1, 1A, or 1B performs the processing of the multiple-image compositing NR corresponding to the input parameter after the moving operation, with respect to the image data of the video image currently being reproduced in display area VIW.

The "NR level" illustrated in FIGS. 18 to 20 is a parameter which is applied in order to determine composite ratio K of the preceding frame image and a current frame image, and is applied in order to reduce noise in the frame image. The "detection level" illustrated in FIGS. 18 to 20 corresponds to the motion-detecting level for detecting an imaging subject illustrated in FIG. 3, and is applied when calculating the motion-detecting threshold in motion-detecting threshold setter 12. The "detection accuracy" and the "detection range" illustrated in FIGS. 18 to 20 respectively indicate the detection accuracy when image processing apparatus 1, 1A, or 1B detects camera motion and the detection range when camera motion is detected.

When a user performs an operation in which checkbox FCB is pressed by cursor CSR, image processing apparatus 1, 1A, or 1B performs the two-dimensional low-pass filter processing for spatial smoothing with respect to a motion pixel detected by motion detector 14 in image-composite processor 15.

The NR level indicates "6" in FIG. 18, and the NR level is changed to "15" in FIG. 19. Accordingly, a noise component in the image data of the video image illustrated in FIG. 19 is lowered compared to a noise component in the image data of the video image illustrated in FIG. 18. Therefore, a user can sufficiently grasp the contents of the video image.

The detection level indicates "7" in FIG. 18, and the detection level is changed to "2" in FIG. 20. Accordingly, the detection level of the moving object in the image data of the video image illustrated in FIG. 20 is lowered compared to the image data of the video image illustrated in FIG. 18. Therefore, the motion-detecting threshold increases, and the after-image of the moving object appears due to the multiple-image compositing NR. However, for example, in a case where a user particularly needs to monitor a background including no moving object, the detection level may be set to a low level.

In addition, image processing apparatus 1, 1A, or 1B of each exemplary embodiment may display the image data of the video image read out from memory 19, and the menu screen of the multiple types of the image processing including the multiple-image compositing NR on the same screen of display DP (refer to FIG. 21). Hereinafter, a screen example displayed on same screen WD7 of display DP will be described with reference to FIG. 21.

FIG. 21 is a view illustrating a display example in which display area VIW of the viewer of a video image and each of display areas MNU1, MNU2, and MNU3 of the image processing menu are displayed on same screen WD7 showing a video image after being subjected to each type of the image processing such as the spatial tone correction, the multiple-image compositing NR, and the snow and rain removal. In FIG. 21, a user performs an operation in which each of menu bar MNU1 of the spatial tone correction, menu bar MNU2 of the multiple-image compositing NR, and menu bar MNU3 of the snow and rain removal is pressed by cursor CSR1, and the image data of the video image subjected to the image processing corresponding to each of the menu bars is displayed in display area VIW by image processing apparatus 1, 1A, or 1B. In other words, image processing apparatus 1, 1A, or 1B according to each of the exemplary embodiments is not limited to the single-type image processing (for example, the multiple-image compositing NR) described with reference to FIGS. 15 to 20. While the image data of the video image is displayed in display area VIW, multiple types of the image processing can be executed in response to a simple operation of a user. Thus, multiple types of image processing results can be intuitively and visually shown to a user.

The spatial tone correction is image processing in which predetermined parameters (for example, a correction method, correction strength, a degree of color emphasis, brightness, and a correction range) are converted into different parameters (for example, a weighting coefficient, a weighting range, a histogram upper-limit clipping amount, a histogram lower-limit clipping amount, a histogram distribution coefficient setting value, a distribution start/end position, an image blend ratio, and a color gain) corresponding thereto, a local histogram is generated and shaped with respect to an input frame by using the parameters obtained after the conversion, and tone conversion and color emphasis are performed by generating a tone curve. In addition, the snow and rain removal is image processing in which an image at a corresponding position in an image after being subjected to filter processing or an image of a current frame is used as the image of the moving area in accordance with whether or not the moving area (that is, the area in motion) in an image of the input frame is greater than the designated size corresponding to a correction parameter for removing snow or rain.

In addition, in FIG. 21, similar to FIG. 18, a user performs an operation in which each of the markers of menu bar MNU1 of the spatial tone correction, menu bar MNU2 of the multiple-image compositing NR, and menu bar MNU3 of the snow and rain removal corresponding to marker DT1 illustrated in FIG. 17 is pressed by cursor CSR1, display controller CT of image processing apparatus 1, 1A, or 1B deploys display area MNU1D and the like of the detailed operation screen for setting the multiple input parameters respectively related to the spatial tone correction, the multiple-image compositing NR, and the snow and rain removal and displays the same on the screen. The illustration of the display area of the detailed operation screen for setting the multiple input parameters respectively related to the spatial tone correction and the snow and rain removal is omitted. For example, in the spatial tone correction, when a user performs an operation, the correction method, the correction strength, the degree of color emphasis, the brightness, and the correction range) are input or designated. In addition, in the snow and rain removal, the correction parameter (that is, the correction strength) for removing snow or rain is input or designated.

Accordingly, image processing apparatus 1, 1A, or 1B can unerringly execute or stop executing the image processing corresponding to pressing operations of the display areas MNU1, MNU2, and MNU3 through a simple operation of a user (that is, the presence or absence of pressing menu bars MNU1, MNU2, and MNU3 related to the multiple types of the image processing) in a state where the image data of the video image displayed in display area VIW is reproduced, and thus, it is possible for a user to simply check the processing result before and after the image processing. In addition, image processing apparatus 1, 1A, or 1B can unerringly execute or stop executing the image processing in response to the operation of changing any of the parameters displayed in the display area (for example, display area MNU2D) of the detailed operation screen for setting each of the parameters in the multiple types of the image processing, and thus, it is possible for a user to simply check the processing result before and after the image processing.

INDUSTRIAL APPLICABILITY

The present invention is useful for an image processing apparatus in which an after-image of a mobile object in a composite image is reduced even in a case where contrast fluctuates, and an image processing method.

REFERENCE MARKS IN THE DRAWINGS 1, 1A, 1B IMAGE PROCESSING APPARATUS
11 UI FOR SETTING OF MOTION-DETECTING LEVEL
12 MOTION-DETECTING THRESHOLD SETTER
13 CONTRAST ANALYZER
13A CONTRAST SETTER
14 MOTION DETECTOR
15 IMAGE-COMPOSITE PROCESSOR
16 FINITE DIFFERENCE CALCULATOR
17 SMOOTHING PROCESSOR
18 FRAME BUFFER
19 MEMORY
20 IMAGE DIVIDER
21 UI FOR SETTING OF AREA/CONTRAST
22 HISTOGRAM GENERATOR
31 SLIDE-BAR
31a SLIDER
32 VALUE DISPLAY
41 MOTION-DETECTING THRESHOLD TABLE
50 INPUT FRAME IMAGE
53, 55 OBSERVATION AREA
61, 63, 65 HISTOGRAM
71, 73, 75 CONTRAST
CT DISPLAY CONTROLLER
DP DISPLAY
WD1, WD2, WD3, WD4, WD5, WD6, WD7 SCREEN

The invention claimed is:

1. An image processing apparatus which performs image processing of an input frame image, the image processing apparatus comprising:
a memory that stores a preceding frame image after being subjected to the image processing; and
a processor that, when executing instructions stored in a storage, performs operations comprising:
calculating contrast of the input frame image;
receiving an input of a motion-detecting level with respect to the input frame image;
calculating a motion-detecting threshold corresponding to the motion-detecting level and the contrast; and
generating a composite image of the input frame image and the preceding frame image stored in the memory based on a comparison result of a finite difference value between the input frame image and the preceding frame image, and the motion-detecting threshold,
wherein a display displays image data and a menu screen of image compositing processing including an operation screen of the motion-detecting level on the same screen.

2. The image processing apparatus of claim 1, wherein the processor further performs operations comprising:
dividing the input frame image into areas,
wherein, in the calculating of the contrast, contrast of the input frame image is calculated for each area of the areas, and
wherein, in the calculating of the motion-detecting threshold, the motion-detecting threshold is calculated for each area of the areas.

3. The image processing apparatus of claim 1, wherein the processor further performs operations comprising:
receiving a selection of a predetermined area with respect to the input frame image and designation of contrast of the predetermined area,
wherein, in the calculating of the motion-detecting threshold, the motion-detecting threshold is calculated for the predetermined area.

4. The image processing apparatus of claim 1,
wherein the display displays the image data and a menu screen of a plurality of types of the image processing having the image compositing processing including the operation screen of the motion-detecting level on the same screen.

5. The image processing apparatus of claim 1,
wherein, in the calculating of the motion-detecting threshold, the motion-detecting threshold is calculated in response to an operation of changing the motion-detecting level with respect to the menu screen of the image compositing processing, and
wherein, in the generating of the composite image, a composite image of the input frame image and the preceding frame image is generated in accordance with the calculated motion-detecting threshold.

6. An image processing method of an image processing apparatus which performs image processing of an input frame image, the image processing method comprising:
calculating contrast of the input frame image;
receiving an input of a motion-detecting level with respect to the input frame image;
calculating a motion-detecting threshold corresponding to the motion-detecting level and the contrast;
generating a composite image of the input frame image and a preceding frame image after being subjected to the image processing based on a comparison result of a finite difference value between the input frame image and the preceding frame image, and the motion-detecting threshold; and
displaying, on a display, image data and a menu screen of image compositing processing including an operation screen of the motion-detecting level on the same screen.

7. The image processing apparatus of claim 4,
wherein, in the calculating of the motion-detecting threshold, the motion-detecting threshold is calculated in response to an operation of changing the motion-detecting level with respect to the menu screen of the image compositing processing, and
wherein, in the generating of the composite image, a composite image of the input frame image and the preceding frame image is generated in accordance with the calculated motion-detecting threshold.

* * * * *